May 8, 1962     H. B. COLE     3,033,731

METHOD FOR THE MANUFACTURE OF OPTICAL IMAGE-TRANSFER DEVICES

Filed March 6, 1958     2 Sheets-Sheet 1

INVENTOR
HENRY B. COLE
BY
*Louis L. Gagnon*
ATTORNEY

May 8, 1962  H. B. COLE  3,033,731
METHOD FOR THE MANUFACTURE OF OPTICAL IMAGE-TRANSFER DEVICES
Filed March 6, 1958  2 Sheets-Sheet 2

INVENTOR
HENRY B. COLE
BY
Louis L. Gagnon
ATTORNEY

United States Patent Office 3,033,731
Patented May 8, 1962

3,033,731
METHOD FOR THE MANUFACTURE OF OPTICAL IMAGE-TRANSFER DEVICES
Henry B. Cole, East Woodstock, Conn., assignor to American Optical Company, Southbridge, Mass., a voluntary association of Massachusetts
Filed Mar. 6, 1958, Ser. No. 719,540
8 Claims. (Cl. 156—175)

This invention relates to improvements in a method for manufacturing optical image transfer devices of the type comprising a very large number of relatively small elongated light-conducting fibers or filaments arranged in side-by-side bunched relation to each other so as to collectively provide light-accepting and light-emitting areas of appreciable sizes at the opposite ends of the devices.

In devices of the above nature, wherein a considerable number of relatively long and thin fibers of light-conducting material are bundled together and used to transmit image forming light from one location to another, it is essential to have each fiber of the bundle orderly and accurately positioned therein with at least the opposite ends of the bundles substantially geometrically identical in character. In certain types of fiberscopes or other such devices which comprise a relatively thin but long bundle of light conducting fibers, it is often desirable to fasten only the opposite ends of the individual fibers, which constitute the bundle, in fixed relation with each other and to allow the intermediate parts of the fibers to be free to flex individually. A device constructed in this manner would obviously be extremely flexible throughout the area between its ends and in instances where image forming light must be directed from one location to another along irregularly shaped paths such a device becomes extremely useful.

In order to form a fiber optical device of the type disclosed which is capable of accurately transferring an optical image from one location to another, the opposite ends of the individual light-conducting fibers must be grouped in accurately aligned parallel side-by-side nested relation with each other and identically geometrically patterned to cause each part of the light of an optical image which is admitted at the entrance end of each fiber of the group, to be emitted from the exit end of said group in its true location so as to reproduce a similar image. It should also be understood that the degree of resolution of an optical image which is transferred by a device of the described character is very much dependent upon the fineness of cross-sectional size of the individual fibers and the uniformity and compactness with which they are bundled together. That is to say, the smaller fibers and the more compact uniform groupings produce the best image resolution.

In producing fiber optical devices, particularly of the type which are capable of transferring optical images with a relatively high degree of resolution, there exists the intricate, time consuming and often times very difficult task of accurately assembling the ends of the group or bundle of individual fibers in the manner discussed above.

In an application Serial No. 703,914, filed December 19, 1957, in the name of John W. Hicks, Jr., et al., there is shown and described means and a method for making fiber optical devices of the character described hereinabove which means and method may be used with a degree of success to form such devices. However, it will be appreciated as this description progresses that this invention accomplishes many of the advantages of the above mentioned application and greatly improves on other conventional techniques used to form fiber optical devices by providing a novel method which greatly simplifies the manufacture of such devices while providing an accurate and faster manufacturing procedure which requires no particular skills to perform.

It is therefore, an object of the present invention to provide a method for the manufacture of optical image transfer devices of the character described wherein such devices may be accurately produced in a rapid, more efficient and greatly simplified manner and with exceptionally high image resolution.

Another object is to provide a technique for forming optical image transfer devices of the above character which involves the use of extremely simple and inexpensive pieces of apparatus and which may be performed rapidly and expertly without requiring any particular skills or knowledge of the art.

Another object is to provide an improved method for assembling an elongated array of relatively fine light-conducting fibers or filaments in fixed accurate end-to-end aligned relation with each other with the cross-sectional pattern of the opposite ends of said array being accurately identically geometrically patterned.

A further object is to provide in the manufacture of fiber optical devices of the above character a novel method of assembling a great number of relatively fine elongated light-conducting elements in accurately geometrically aligned bundled relation with each other comprising forming windings of a continuous thread like light-conducting fiber or filament onto a mandrel in side-by-side relation with each other to produce a plurality of hoop-like members of equal circumference and each of substantially the length desired of the fiber optical device to be formed therefrom, assembling said hoop-like members in progressive surrounding relation with each other with portions of each hoop being stacked in aligned superimposed relation with similar portions of the other hoops, securing said portions together whereby they will remain in said fixed stacked relation with each other and cutting said assembly transversely substantially centrally of said portions whereby the adjacent ends of the severed assembly will become the opposite ends of the optical device being formed and the fibers will thereby inherently be automatically precisely geometrically identically patterned at both ends.

A still further object is to provide a method of forming an elongated intimate group or bundle of accurately aligned relatively fine light-conducting fibers in the above disclosed manner and from which a plurality of separate smaller groups of light transfer devices may be subsequently formed from said bundle by simply severing the opposite ends of the bundle with known means in the direction of the longitudinal axis of the individual fibers.

Other objects and advantages of the invention will become apparent from the following description when taken in conjunction with the accompanying drawings, in which.

Figure 1:
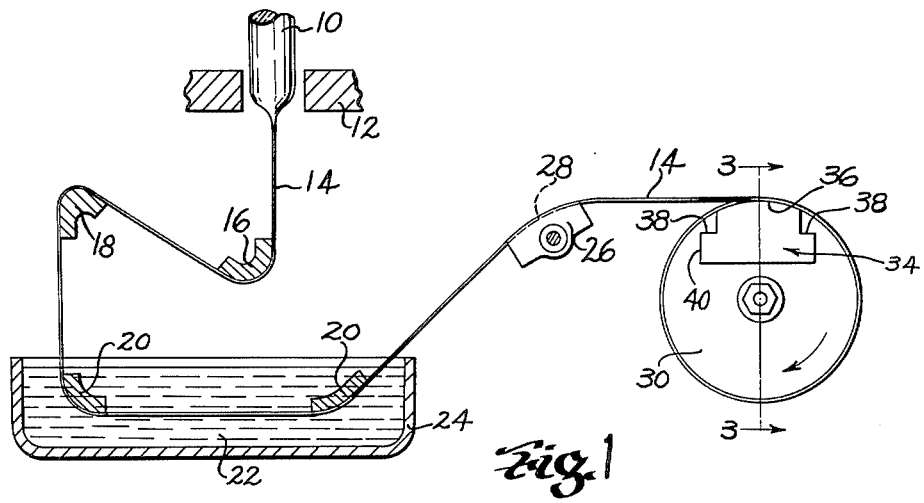
FIG. 1 is a diagrammatic view showing a part of the apparatus for use in forming coated fibers for producing optical image transfer devices in accordance with the present invention.

Referring to the drawings in detail, it will be seen that numeral 10 in FIG. 1 shows a rod of clear, light-conducting material such as a glass or plastic having a relatively high refractive index and arranged preferably in a vertical position so that the lower end thereof will be lowered within and through a hollow electrically energized heating ring (of known construction) or the like 12. When the ring has heated the lower end of the glass or plastic rod sufficiently, a thin thread 14 may be drawn downwardly therefrom and passed about a first polished curved guide 16 and then up and over a second similar guide 18. While this thread, in all cases for best results, will be very fine, nevertheless, its size may be varied appreciably and accurately controlled in size by the rate at which it is uniformly withdrawn from the heated rod 10.

After passing over guide 18, the thread 14 travels downwardly and about guides 20 which are suitably located so that the thread at such time will be caused to pass, as shown, through a coating solution 22 in a tank 24. The purpose of this solution is to form upon and in optical contact with the outer surface of the thread a very thin continuous enclosing or encircling layer or film of material of relatively low refractive index. Preferably, this coating material will be clear and transparent. Thus, later when this thread is cut into shorter lengths and assembled to form an optical image transfer device, the low index layer will function optically to insulate one thread from an adjacent thread and thus insure total internal reflection of all light entering the filaments at one end of the device and travelling therethrough to the opposite end.

A desirable coating material having a low refractive index and suitable for this coating purpose has been found to be a mixture of tetra-ethyl-ortho-silicate having microscopic particles of silica therein. The coating solution provides a thin continuous layer about the thread 14 and may be formed by using ethyl silicate and suspended silica particles in a solution of hydrochloric acid and ethyl alcohol; and when this solution dries, there will be formed on the thread a uniform coating layer which is very thin, which will adhere firmly thereto, and which will be fairly inert to chemical attack. Of real importance also is the fact that this coating layer will have a very low index of refraction and will be in optical contact with the high index material forming the thread so that total internal reflection will occur at all locations therein. For a more detailed description of such an optical image transfer device employing a multiplicity of thin coated filaments or fibers, reference is made to an O'Brien application Serial No. 469,877, filed November 19, 1954, now U.S. Patent No. 2,825,260, issued March 4, 1958. Also, this low index coating material is such that certain glues which are used in the herein-described method and mentioned below will adhere well thereto. While the thickness of the coating layer is very small and may be varied somewhat as different uses require, nevertheless, this layer can be easily altered, by control of the solvents of the solution, so as to provide a thin or very thin layer which may be in the neighborhood of ½ of a wave length in thickness when dry. (Thus, a very small part of the total cross-sectional area of all of the coated threads or filaments of a bundle will be actually occupied by the coating material surrounding the individual filaments.) Another coating material which may be used in like manner would be polyvinyl silicate in a solvent of ethyl alcohol which likewise, after drying, will form upon the thin thread a very thin continuous encasing film or layer.

It is to be understood that the thread or filament 14 may be initially provided with a light insulating coating of the character mentioned above by any known means other than that just described. Furthermore, the rod 10 may be a composite structure consisting of a multiplicity of individually coated rod-like fibers which when drawn to form the thread or filament 14 will cause the thread 14, in itself, to embody an equal number of individual light-conducting elements considerably reduced in cross-sectional size. In this case no further cladding of the fiber is required and the fiber may be directly wound on the mandrel 30.

As the thread leaves the tank 24, it passes upwardly over a curved guide 26 which has a shallow U-shaped groove 28 therein. The leading end of the coated thread or filament is taped or otherwise anchored to a mandrel or drum 30 carried on a machine lathe or the like (not shown) so that as the mandrel 30 is rotated at a uniform preselected speed, successive convolutes or turns of the coated thread or filament will be wound thereon. The guide 26 will be, at this time, suitably secured to and carried by a movable carriage (not shown) of the machine lathe so as to be driven in a direction parallel to the lathe bed and axis of rotation of the lathe by said carriage movement which movement is produced by conventional carriage traversing mechanism of the lathe so as to cause the carriage and guide 26 to move sidewise at a uniform rate. The rate at which the carriage will be moved, of course, will be such that the thread or filament being placed on the mandrel will wind a substantially closed helix formed of the thread 14 on the mandrel.

The diameter of the drum or mandrel 30 which will be employed for winding the helix will be chosen in accordance with the length of fibers desired for forming the image transfer device, as will presently appear from the description which follows, and the thinness of the coated thread will depend somewhat upon the surface curvature of the drum 28 so that breaking of the thread will not occur.

Figure 2:
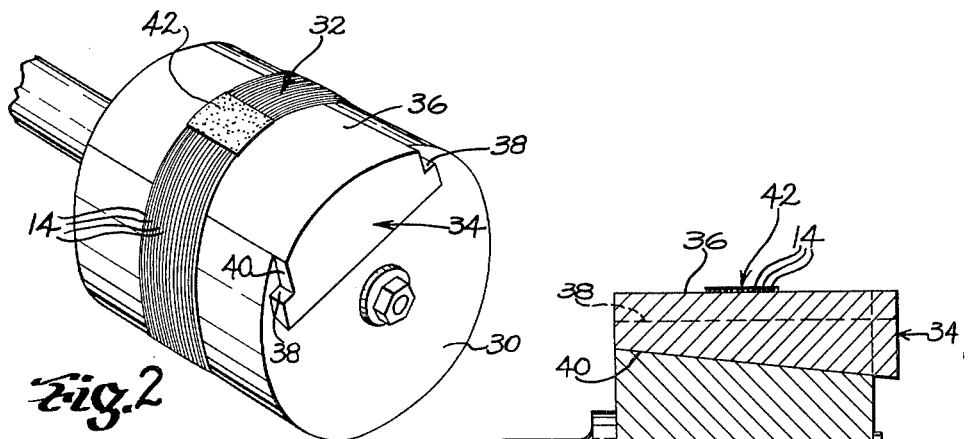
FIG. 2 is a perspective view of the mandrel or drum of FIG. 1 upon which has been wound a thread or filament or light-conducting material for use in forming such devices.
Figure 3:
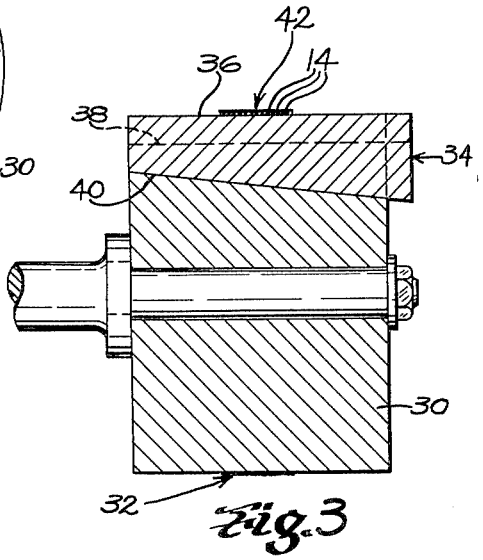
FIG. 3 is an enlarged fragmentary cross-sectional view taken substantially on line 3—3 of FIG. 1.

Such a mandrel having a helix 32 wound thereon is shown in FIG. 2. For reasons which will later appear, it is essential to have the successive turns or convolutes of the helix closely adjacent one another. In the application of John W. Hicks et al., Ser. No. 703,914 there is disclosed in detail, novel means and method not shown or described herein for obtaining a closely wound helix of the character desired.

Figure 4:
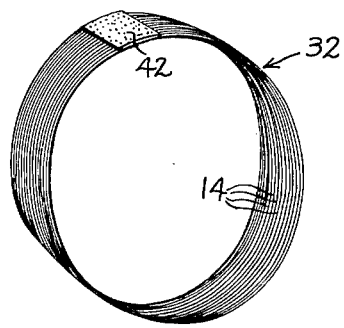
FIG. 4 is a perspective view of a helix or hoop formed of said light-conducting fiber or filament which has been removed from the mandrel of FIGS. 1 and 2.

Since the practice of the present invention requires that the helix 32 be removed from the mandrel or drum 30 to provide a hoop-like structure such as illustrated in FIG. 4 which will subsequently be assembled with other similar structures, the drum 30 is provided with a removable tapered section 34 having an outer surface 36 accurately shaped to the peripheral curvature of the drum 30 so as to form a smooth continuous winding surface on the drum which is concentric with its axis of rotation when the section 34 is in a position to use such as shown in FIGS. 1 and 2.

The opposite sides of the section 34 are each provided with protruding tapered flange parts 38 having their uppermost surfaces parallel with the outer surface 36 of the section 34 and a transversely extending dovetailed recess 40, which is complementary in cross-sectional shape to the section 34, is provided in the drum 30 to receive the section 34 and to cause the outer surface 36 of the section 34 to be maintained in substantially parallel relation with the axis of rotation of the drum 30 at all times during its insertion or removal therefrom. When the removable section 34 is fully positioned within the recess 40, its outer surface 36 will automatically become substantially concentric with the outer peripheral surface of the drum 30 and thus provide a continuous winding surface for receiving a helix 32. However, when the removable insert 34 is forced out of the recess 40 following the winding of a helix 32 formed of the thread 14, the helix will become loosened on the drum 30 and may then be easily slipped endwise off the drum 30.

It is pointed out that other types of winding drums which may be collapsed in a well known manner might also be used to form the helix 32; it is only important that means is provided for allowing the helix 32 to be easily removed from the winding drum without disrupting the above mentioned closely wound relationship of the successive turns or convolutes of the helix.

In order to rigidly bind a predetermined area of the successive turns of the helix 32 in fixed side-by-side relation with each other prior to their removal from the drum 30, the helix is treated along a strip 42 with a suitable glue or cement preferably in the form of an epoxy resin which will also later serve the purpose of adhering successive layers of other helices which will form a stack or bundle as will be presently described.

Previous to the winding of the helix 32 on the drum 30, the winding surface of the drum is treated with a mold release wax or the like at least at the location thereon beneath the strip 42. This prevents the adhesive material of the strip 42 from sticking to the drum 30 and thus allows the helix 32 to be easily removed from the drum.

As stated previously, it is of the utmost importance that even though the number of filaments or fibers per square inch of cross-sectional area in an image transfer device to be formed from many such layers of filaments may be very high (as much as 250,000 per square inch), all of these individual filaments or fibers at the opposite ends of the device should be substantially identically geometrically arranged. This is necessary in order that good image resolution will be obtained.

Figure 5:
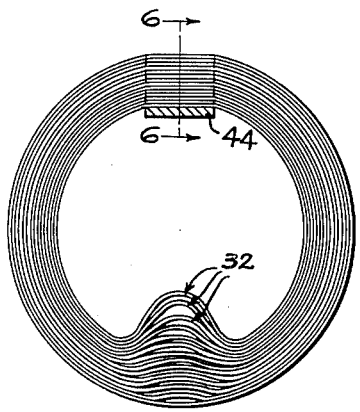
FIG. 5 is a side elevational view of an assembly of a plurality of hoops which have been initially individually formed on the mandrel of FIGS. 1 and 2.

In order to produce a stack or bundle of fibers which is of a desired cross-sectional area in accordance with that desired of the image transfer device to be formed therefrom, the helix or hoop-like assembly 32 is separated into predetermined widths by cutting through the glued section or strip 42 in the direction of the convolutes thereof and the separated widths thereof are stacked in progressive surrounding relation with each other in the manner shown in FIG. 5. It is pointed out that alternatively, the number of turns which make up the width of the helix 32 may be controlled to produce a helix which is only of the width desired of the final product to be formed therefrom. In such a case, several helices would be successively wound on the drum 30, removed therefrom and stacked in surrounding relation with each other. In either case, the stacking of the helices or hoop-like assemblies 32 is accomplished with a U-shaped member 44, FIGS. 5 and 6, which has a channel therein selected to be of a width such as to rather intimately receive the side edges of hoop-like assemblies 32 in the manner illustrated more particularly in FIG. 6. The assembly operation embodies placing the helices one at a time with the treated or glued portion 42 thereof in superimposed stacked relation with each other in the member 44 and applying a thin layer of cement or glue between each of the helices 32 to rigidly secure them together within the support 44. In order to assure that the final assembly of helices or hoops 32 may be easily removed from the member 44, the internal surfaces are preferably waxed prior to an assembly operation to prevent the cement or glue from adhering to the member 44. In certain instances, however, it may be desirable not to wax the support 44 and to intentionally cause the support 44, which may be formed of sheet metal or the like, to be rigidly secured to the assembly of hoops 32. In such a case, the member 44 would ultimately provide attachment means for supporting optical systems or the like on each of the opposite ends of the fiber optical device formed from the assembly of hoops 32 when said assembly is severed as shown in FIG. 7 in a manner to be presently described.

During the assembly of the helices or hoops 32, it is important that all the layers in the bundle have the same helix direction. That is, each hoop 32 must be progressively placed in surrounding relation with the previously assembled hoop and the direction of wind or helix of the hoop must match that of its predecessor. If for any reason the helix direction of a hoop 32 should not be properly directed, the hoop 32 may be simply turned inside out prior to its assembly.

While the description thus far has dealt with the forming of single layer hoops 32 it is possible, because of the very small diameter of the fibers to form hoops of two or three layers on the drum 30. In such a case each successive layer must be wound separately over its preceding layer and in the same helix direction. The layers may be joined on the drum 30 with a glue or cement in the manner illustrated at 42 in FIGS. 2 and 4 and removed from the drum as a unit and many such units may thereafter be assembled in superimposed surrounding relation with each other.

Figure 6:
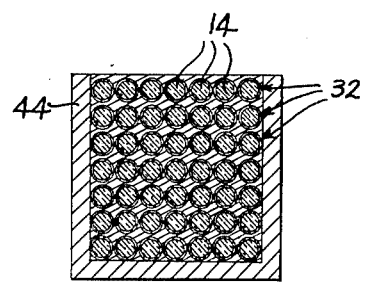
FIG. 6 is a cross-sectional view taken on line 6—6 of FIG. 5.
Figure 9:
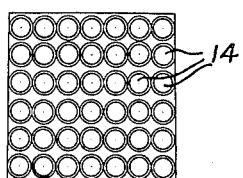
FIG. 9 is an enlarged end view of the assembly of FIG. 8.
Figure 7:
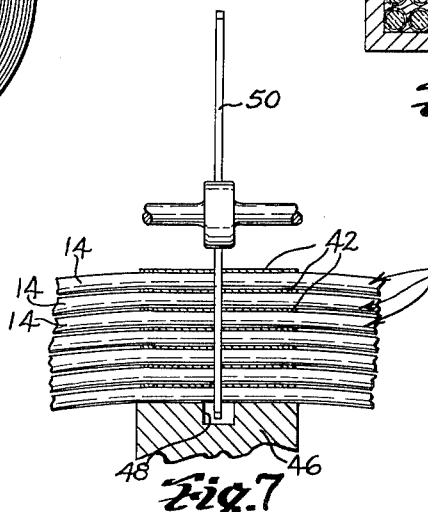
FIG. 7 is an enlarged fragmentary cross-sectional view of a part of the assembly of FIG. 5 illustrating a further step in the process of the invention.

Following the assembly of the hoops 32 with the apparatus of FIGS. 5 and 6, the bundle is lifted from the channel member 44 and placed on a grooved support 46, FIG. 7, with the helix direction of the bundle aligned substantially normal to the groove 48 in the support 46 and the glued or cemented portions or strips 42 of the layers aligned with their central longitudinal axes directly over the groove 48.

The bundle is then severed in the direction of the groove by passing a relatively thin saw 50 or any other well known similar cutting tool across the bundle in the manner illustrated in FIG. 7.

It is particularly pointed out that by so cutting the bundle, accurate positioning of the individual light-conducting fibers at the opposite ends of the bundle automatically results from the fact that the individual helices or hoops 32 were initially constructed in a neat and regular wind and assembled with their helix directions aligned parallel to each other. Furthermore, the ends of the bundle which are formed by the above mentioned cutting operation were once integral and the amount of stock removed from between said ends which is equal only to the thickness of the saw cut does not alter the identical geometric pattern of the fibers at either of the ends of the bundle.

It is also pointed out that since the individual helices are each initially formed to have substantially equal outside diameters and are stacked in progressive surrounding relation with each other as described above, the saw cut illustrated in FIG. 7 will sever each of the fibers of the stacked assembly in a plane substantially normal to their longitudinal axes and thus cause the fibers of the severed assembly to each be of the same length.

It is pointed out that if the channel member 44 was purposely retained on the bundle as suggested hereinabove, it would be severed by the saw 50 during the cutting operation illustrated in FIG. 7 and would provide means at each end of the bundle for attaching the bundle to other instruments or lens systems or the like which might be used in conjunction with a fiber optical device.

Figure 8:
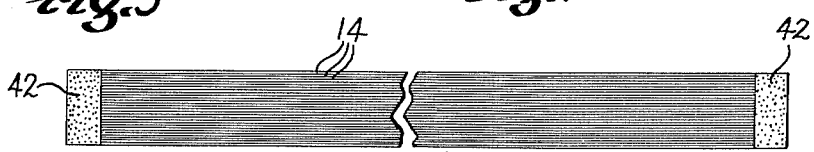
FIG. 8 is a plan view of a finished assembly of elongated light-conducting fibers formed in accordance with the invention.

When the bundle has been cut as described above it will be removed from the grooved support 46 and opened up as shown in FIG. 8 to form a composite elongated fiber optical device with the individual fibers therein securely fastened at each end in accurately aligned geometrically identical patterns and with the fibers being of equal lengths.

Figure 11:
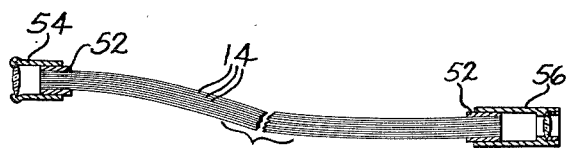
FIG. 11 is an optical instrument embodying an optical image transfer device of the character described.

When the device has been thus formed, the opposite ends thereof will be suitably ground and polished, or alternatively the ends may be pressed into a suitable epoxy resin contained within small, rigid enclosing metal or plastic collars, such as indicated at 52 in FIG. 11, and allowed to dry thoroughly, so that the ends of the bundle of fibers will be thus completely surrounded and retained in their metal or plastic collars by said resin. Thereafter, the ends of the bundle so mounted in collars 52 may be ground and polished. This grinding and polishing of the bundle makes the bundle readily receptive to the transmission of light through the squared off ends of the individual fibers thereof. The metallic or plastic collars surrounding the epoxy resin embedded bundle of fibers may be arranged to serve as mounting means for optical components, as indicated in FIG. 11, wherein a convergent eye lens and mount 54 are suitably supported on one collar 52 and a conventional objective lens and mount 56 is adjustably positioned upon the outer surface of the other collar 52.

While both glass and plastics have been referred to previously for use in forming the thin flexible thread 14, it is pointed out that glass is preferred since the necessary controls with reference to the drawing of uniform thin threads of different preselected sizes are less critical and a more stable end product is obtained.

Figure 10:
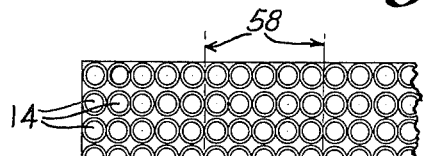
FIG. 10 is an enlarged fragmentary end view of a modified form of an article manufactured in accordance with the invention.

An alternate method of producing a plurality of fiber optical devices of the above character would be to wind a plurality of helices 32 of a considerable width and assemble the same in surrounding superimposed relation with each other in the manner discussed above. When cut and stretched out as illustrated in FIGS. 7 and 8 respectively, a rectangularly shaped bundle (an end view of which is illustrated in FIG. 10) would be formed which is considerably wider than it is high. The bundle may then be subdivided into a number of separate units as indicated at 58, each having a predetermined cross-sectional area.

Since only the ends of the individual fibers of a device of the character described are rigidly secured together the area intermediate the ends thereof is obviously extremely flexible. This feature is very desirable when the devices are to be used in instruments such as shown in FIG. 11. However, in certain applications of use it may be required that the devices be rendered relatively rigid throughout their entire length. This may be accomplished by placing a bundle or article such as shown in FIG. 8 in an elongated trough-like form which may be either straight or irregularly shaped throughout its length and applying a suitable cement, glue or epoxy resin, which will flow in and around the individual fibers, throughout the intermediate area of the fibers between their ends. When the cement, glue or resin has hardened, a relatively rigid structure or device will be formed precisely to the contour shape of the form or trough and when removed therefrom it will permanently retain the shape of said trough.

From the foregoing, it can be seen that improved, simplified and economical means and method have been provided for accomplishing all the objects and advantages of the invention. However, it should be apparent that many changes in the details of construction, arrangement of parts and steps in the process may be made by those skilled in the art without departing from the spirit of the invention as expressed in the accompanying claims and the invention is not to be limited to the exact matters shown as only the preferred matters have been given by way of illustration.

Having described my invention, I claim:

1. The method of forming an optical image transfer device embodying a multiplicity of relatively long fibers of relatively small cross-section having their opposite ends secured together in substantially identically geometrically arranged patterns comprising the steps of winding a series of continuous thread-like light-conducting fibers upon a mandrel for forming a plurality of individual substantially identical hoop-like members each embodying one of said fibers in the form of a helix of a continuous thread-like light-conducting fiber having close fitting convolutes, securing said convolutes of each of said hoop-like members together throughout a limited area thereof by means of a relatively narrow transversely extending strip of adhesive material, removing said hoop-like members from said mandrel, forming an assembly of said hoop-like members by progressively stacking the limited areas of said members in superimposed relation with each other with the helix directions of their respective convolutes aligned substantially parallel to and accurately superimposed upon each other at least throughout said secured areas and with said strips of adhesive material relatively accurately superimposed upon each other, bonding the respective adjoining adhesive strips of said hoop-like members together as each is stacked upon the other to form a composite unitary structure throughout a section of said assembly of said hoop-like members including said secured areas of the members, and cutting through said section in a direction substantially normal to the direction of wind of the convolutes of said hoop-like members to form said ends of said image transfer device.

2. The method of forming an optical image transfer device comprising a multiplicity of filaments of relatively small cross-section having their opposite ends secured together in substantially identically geometrically arranged patterns and in closely packed relation with each other, said method comprising the first step of winding at least one continuous flexible filament of light-conducting material in such manner as to form a helix of close fitting adjacent convolutes having identical helix directions and angles, the second step of applying an adhesive material transversely across a relatively narrow section of said helix to secure said convolutes together and permanently retain said close fitting adjacent relationship thereof throughout said section, repeating said first and second steps a sufficient number of times to produce a desired number of similar helices, forming an assembly of said helices by stacking the same in progressive surrounding relation with each other with the helix directions of their respective convolutes aligned in substantially parallel relation with each other and with the portions of said fibers which extend throughout said sections having said adhesive material in relatively accurately superimposed relation with each other, bonding said sections of said helices together to form an integral structure throughout the cross-sectional area bounded by said sections, cutting through said area of said assembly in a direction substantially normal to the axes of said fibers therein to form said opposite ends of said device.

3. The method of forming an image transfer device of the character described having substantially identically geometrically patterned end sections comprising winding a thread-like filament of light-conducting material on a mandrel in such a manner as to form a helix of closely packed convolutes, said helix being of a width greater than that desired of said device, securing said convolutes together by applying an adhesive material transversely across said helix throughout a restricted area thereof, dividing said helix into separate parts of widths substantially that desired of the resultant image transfer device by cutting through said adhesive material between the convolutes of said filament at predetermined spaced locations across the width of the said helix in accordance with the width desired of said separate parts and severing the resultant portion of the filament connecting said parts, assembling said parts with their respective areas of adhesive material in superimposed relation with each other and with the convolutes of each of said parts placed one above the other with their helix directions parallel to each other, joining the adjacent adhesive areas together, cutting said assembly of said parts through said joined adhesive areas in a direction substantially normal to the axes of said convolutes to form said image transfer device having substantially identically geometrically patterned end sections.

4. The method of forming image transfer devices of the character described having substantially identically geometrically patterned end faces comprising the first step of winding a thread-like filament of light-conducting material on a mandrel in such a manner as to form a helix of closely adjacent convolutes, said helix being of a width greater than that desired of each of said devices, the second step of adhering said convolutes together throughout a limited area of said helix, repeating said first and second steps a sufficient number of times to produce a desired number of similar helices, assembling said helices with the portions of the convolutes which extend through said restricted areas thereof in progressively superimposed parallel aligned relation with each other, adhering the adjacent areas together to form said helices into an integral structure throughout a section defined by said respective areas thereof, cutting said assembly through said section in a direction substantially normal to the direction of the axes of said convolutes to form end faces on said assembly, sub-dividing each of said end faces at predetermined spaced locations along their widths in accordance with the widths desired of each of said image transfer devices by cutting through the same in the direction of the axes of said convolutes whereby the opposite end faces of each of said devices will be substantially identically geometrically patterned.

5. The method of forming an elongated optical image transfer device of the character described having substantially identically geometrically patterned end faces comprising the first step of furnishing a mandrel having a continuous winding surface the circumference of which is substantially equal to the length desired of the optical image transfer device, the second step of winding a continuous flexible filament of light-conducting material on said mandrel in such a manner as to form a helix having adjacent convolutes in close fitting relation, said helix being formed to a predetermined width in accordance with the width desired of the device to be formed therefrom, the third step of fixedly securing said convolutes together for maintaining said convolutes in said close fitting relation throughout a relatively narrow transversely extending area, the fourth step of removing said helix endwise from said mandrel, repeating the second, third and fourth method steps a sufficient number of times to produce a desired number of similar helices, assembling said helices with the axes of the portions of the convolutes which extend through said areas in progressively accurately superimposed substantially parallel aligned relation with each other, fixedly securing said helices together so that said convolute portions are maintained in said superimposed parallel relation, and cutting through said areas transversely of said axes of said convolutes to form said opposite end faces of said device whereby the resultant faces of the filaments of said cut assembly will be identically geometrically patterned.

6. The method of forming an optical image transfer device embodying a multiplicity of relatively long fibers of relatively very small cross-section having their opposite ends similarly geometrically arranged in intimately grouped relation with each other comprising the steps of winding a series of continuous thread-like light-conducting fibers upon a mandrel for forming a plurality of individual similar hoop-like members each embodying one of said fibers as a helix having close fitting adjacent convolutes, securing said convolutes of each of said hoop-like members together by applying adhesive material to said convolutes across a relatively narrow transverse section thereof, stacking said hoop-like members one at a time in surrounding relation with each other with the axes of the portions of their respective convolutes which extend through said sections thereof aligned in superimposed parallel relation with each other, adhering each of said sections together in said aligned superimposed relation with each other to form an integral composite structure throughout the area defined by said sections of said helices, cutting transversely and substantially centrally through said area in a direction substantially normal to the axes of the convolutes of said hoop-like members to form the ends of said image transfer device, shaping the intermediate portion of said device to a desired configuration and applying a hardenable adhesive material to said intermediate portion, and curing said hardenable adhesive material to cause said intermediate portion to permanently retain said desired shape.

7. The method of making an optical image transfer device formed of a multiplicity of filaments of relatively small cross-section having their opposite ends similarly geometrically arranged in closely packed relation comprising the first step of winding a continuous flexible filament of light-conducting material upon a mandrel in the form of a first helix of close fitting adjacent convolutes, the second step of winding at least one other similar helix over said first helix with the convolues of said other helix accurately superimposed and parallel to the convolutes of said first helix, the third step of applying bonding material transversely across a section of said wound helices to permanently retain said close fitting adjacent relationship of the convolutes thereof throughout said section and to secure said helices together as a unit, repeating the first, second and third method steps a sufficient number of times to produce a desired number of similar units, assembling said units in progressive surrounding relation with each other with their respective sections in aligned superimposed relation with each other and with the helix directions of the convolutes of each of said units aligned parallel to each other, adhering said adjoining sections of said units together, cutting said assembly along a line passing approximately centrally through said sections and transversely of the direction in which said helices of the assembly are initially wound to form the opposite ends of said device with the filaments thereof securely fastened together and identically geometrically patterned at their respective opposite end faces.

8. The method of forming an optical image transfer device comprising furnishing a plurality of hoop-like members each embodying a continuous fiber of light-conducting material, said members each having a plurality of closely wound convolutes of said fiber of substantially identical helix angles, fixedly securing the respective convolutes of each of said members together for maintaining said convolutes in said closely wound relation throughout an area which extends transversely across the fiber convolutes and which extends along a selected length of the convolutes, placing said hoop-like members in assembled relation with each other with the secured areas thereof superimposed and the respective convolutes in parallel aligned relation with each other throughout said area, fixedly securing said hoop-like members together so that said secured areas thereof are maintained in said superimposed aligned relation and cutting through the resulting secured areas transversely of said fiber convolutes.

References Cited in the file of this patent

UNITED STATES PATENTS

| | | |
|---|---|---|
| 2,311,704 | Simison | Feb. 23, 1943 |
| 2,442,946 | Barton | June 8, 1948 |
| 2,825,260 | O'Brien | Mar. 4, 1958 |

OTHER REFERENCES

Hopkins et al.: "Nature," volume 173, January 2, 1954, pages 39–41.

Kapany et al.: Journal of the Optical Society of America, volume 47, No. 7, July 1957, pages 594–598.